US 8,250,726 B2

(12) United States Patent
Cohen et al.

(10) Patent No.: US 8,250,726 B2
(45) Date of Patent: Aug. 28, 2012

(54) PIPE, METHOD FOR PRODUCTION THEREOF AND CORRESPONDING TOOL

(75) Inventors: Marc Cohen, Pont-à-Mousson (FR); Laurence Guyonnet, Pont-à-Mousson (FR); Roger Mutis, Cheminot (FR)

(73) Assignee: Saint-Gobain Pam, Nancy (FR)

( * ) Notice: Subject to any disclaimer, the term of this patent is extended or adjusted under 35 U.S.C. 154(b) by 1017 days.

(21) Appl. No.: 11/876,052

(22) Filed: Oct. 22, 2007

(65) Prior Publication Data
US 2008/0099220 A1 May 1, 2008

(30) Foreign Application Priority Data
Oct. 26, 2006 (FR) ...................................... 06 09422

(51) Int. Cl.
*B23P 25/00* (2006.01)
*B23B 45/16* (2006.01)
(52) U.S. Cl. ........................................... 29/458; 173/94
(58) Field of Classification Search ............... 29/33 D, 29/458, 460, 527.5, 33 T, 234, 272; 174/93; 138/145; 173/94
See application file for complete search history.

(56) References Cited

U.S. PATENT DOCUMENTS

| 2,724,672 | A | 11/1955 | Rubin |
| 3,356,108 | A | 12/1967 | Johnston |
| 5,205,886 | A | 4/1993 | White |
| 5,207,248 | A | 5/1993 | Seki et al. |
| 2004/0028921 | A1 | 2/2004 | Amouroux |
| 2005/0025922 | A1 | 2/2005 | Rydin et al. |

FOREIGN PATENT DOCUMENTS

| JP | 54-53314 A | | 4/1979 |
| JP | 55070457 | * | 5/1980 |
| JP | 2002-307150 A | | 10/2002 |
| RU | 2258006 C2 | | 12/2004 |
| RU | 2279352 C2 | | 2/2005 |

* cited by examiner

*Primary Examiner* — John C Hong
(74) *Attorney, Agent, or Firm* — Sughrue Mion, PLLC

(57) ABSTRACT

A pipe includes a base body (8) of metal, defining an outer surface (10) of the base body and an inner surface (12) of the base body, and an inner coating (14) which is applied to the inner surface (12) of the base body. The inner coating (14) includes a thermoplastic material or a polyamide. The pipe may be used in the transport of drinking water.

12 Claims, 5 Drawing Sheets

PIPE, METHOD FOR PRODUCTION THEREOF AND CORRESPONDING TOOL

TECHNICAL FIELD

The present invention relates to a pipe, of the type comprising:
 a base body of metal, defining an outer surface of the base body and an inner surface of the base body, and
 an inner coating which is applied to the inner surface of the base body.

BACKGROUND TO THE INVENTION

From the prior art, pipes are known for transporting drinking water, used in particular in the field of water supply.

These pipes comprise a metal base body, to the inner surface of which there is applied an inner coating which is suitable for contact with foodstuffs. The coatings which are generally used require the inner surface of the base body to be prepared so that the coating is able to bond adhesively. The methods for preparing the inner surface are conventionally either shot-blasting alone or grinding, or a combination of drilling and shot-blasting.

These methods for preparing the inner surface of the base body are costly. This is particularly the case with shot-blasting owing to the time and the cost associated with recycling the shot.

Furthermore, these methods for preparing the surface sometimes require the use of a primer in order to obtain the required level of adhesion for the coating.

SUMMARY OF THE INVENTION

The object of the invention is to reduce the production costs of the pipe.

To this end, the invention relates to a pipe of the above-mentioned type, the inner coating comprising a thermoplastic material based on polyolefines or based on polyamide.

According to specific embodiments, the pipe according to the invention comprises one or more of the following features:
 the inner coating is constituted by a thermoplastic material and an acrylic material;
 the base body is of cast iron, in particular spheroidal graphite iron;
 the base body has a mean wall thickness of less than 4 mm;
 the inner surface is obtained by means of hammering.

The invention further relates to a production method, wherein it comprises the steps involving:
a) removing rough portions from an unprocessed inner surface of a base body, thus obtaining an inner surface which is partially drilled, the removal of the rough portions being carried out by means of partial drilling of the unprocessed inner surface;
b) at least partially removing a layer of oxide by hammering the drilled inner surface, a hammered inner surface being obtained;
c) applying an inner coating to the hammered inner surface, this coating comprising a thermoplastic material based on polyolefines or based on polyamide.

According to specific embodiments, the method according to the invention comprises one or more of the following features:
 the inner coating is constituted by a thermoplastic material and an acrylic material;
 the step for application of the inner coating involves the projection of solid particles of coating onto the surface of the base body; and,
 before the step for application of the coating, the base body is heated to a fusion temperature of the coating particles;
 before the step for application of the coating, the drilling and hammering residues are removed, in particular by means of suction or blowing;
 before the drilling step, a supplementary step for producing the base body from cast iron, in particular spheroidal graphite iron, is implemented.

Finally, the invention relates to a tool for processing an inner surface of a base body of a pipe, the tool defining a centre axis, wherein the tool comprises:
 an axial drilling portion which is provided with at least one drilling blade which can be radially moved relative to the centre axis of the tool, and
 an axial hammering portion which is provided with at least a first hammering element which can be radially moved relative to the centre axis of the tool and which is free in terms of rotation about its own axis which extends parallel with the centre axis of the tool.

Furthermore, the surface processing tool may comprise the following feature:
 the axial hammering portion comprises a second hammering element which can be radially moved relative to the centre axis and which is free in terms of rotation about its own axis which extends parallel with the centre axis of the tool.

BRIEF DESCRIPTION OF THE DRAWINGS

The invention will be better understood from a reading of the following description, given purely by way of example and with reference to the appended drawings, in which.

DESCRIPTION OF PREFERRED EMBODIMENTS

Figure 4:
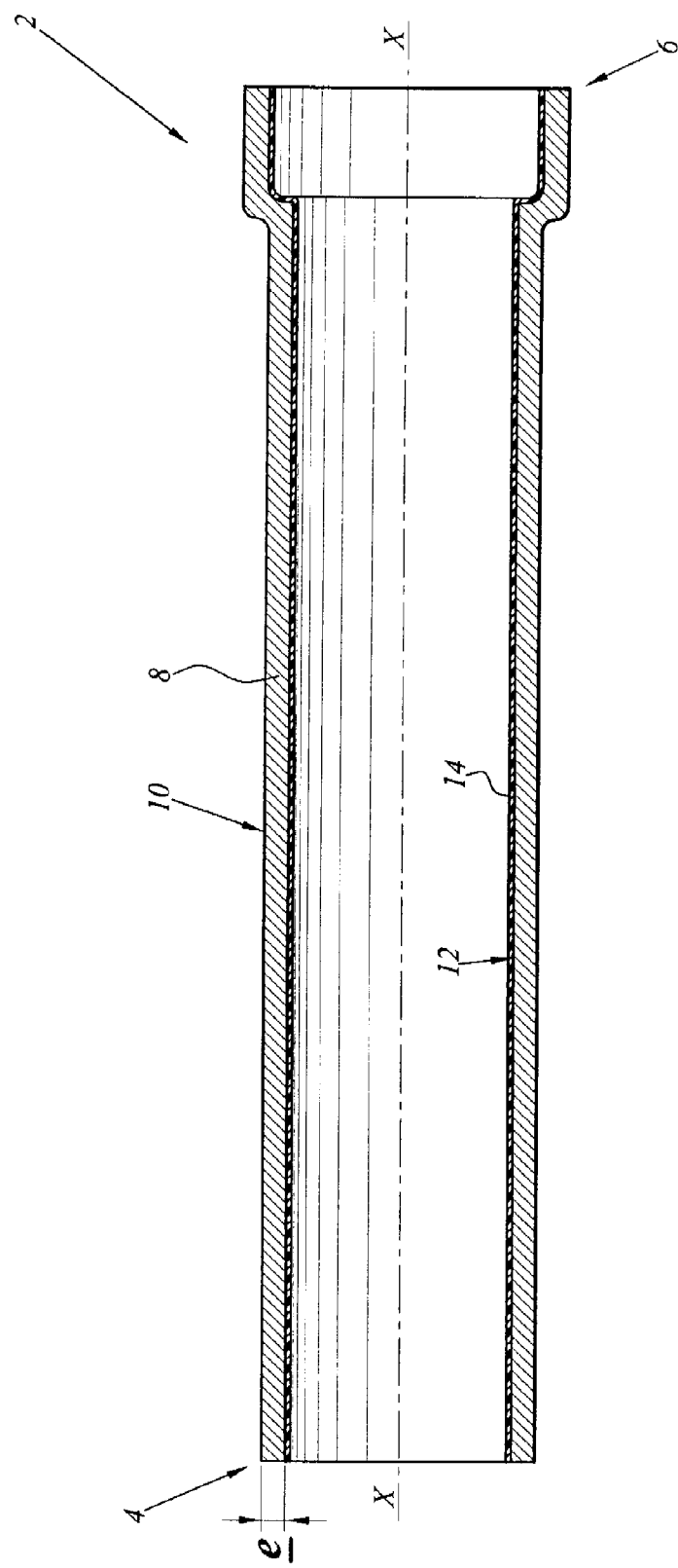
FIG. 4 is a longitudinal section of the finished pipe according to the invention.

FIG. 4 illustrates a pipe according to the invention, generally designated 2.

This pipe 2 extends along a centre axis x-x and has a first end which has a flat end-piece 4 and a second end which comprises a nesting end-piece 6.

The pipe 2 is constituted by a base body 8, produced, for example, from cast iron, and in particular spheroidal graphite iron. This base body 8 defines a base body outer surface 10 and a base body inner surface 12.

In the case of the pipe 2, the outer surface 10 is a free surface, but may also be covered with an outer coating.

The pipe 2 further comprises an inner coating 14 which is applied to the inner surface 12. The inner coating 14 is of a material which complies with all the European hygiene provisions, so that the pipe 2 is suitable for transporting drinking water, in particular in the field of water supply.

According to the invention, the inner coating 14 comprises a thermoplastic material which may be based on polyolefines or based on polyamide. Preferably, the inner coating 14 is constituted by a thermoplastic material and an acrylic material. Owing to these materials, the inner coating 14 adhesively-bonds to the inner surface 12 in an effective manner.

The polyamide material may be, for example, a polyamide 11 or 12 (NYLON®).

The thermoplastic material may, for example, comprise polyethylene functionalised by means of co-polymerisation with an acrylic.

The use of this inner coating 14 allows the base body 8 to be produced with a particularly small wall thickness e. The wall thickness e is, for example, on average less than 4 mm. The thickness of the coating 14 is, for example, less than 1 mm.

Figure 1:
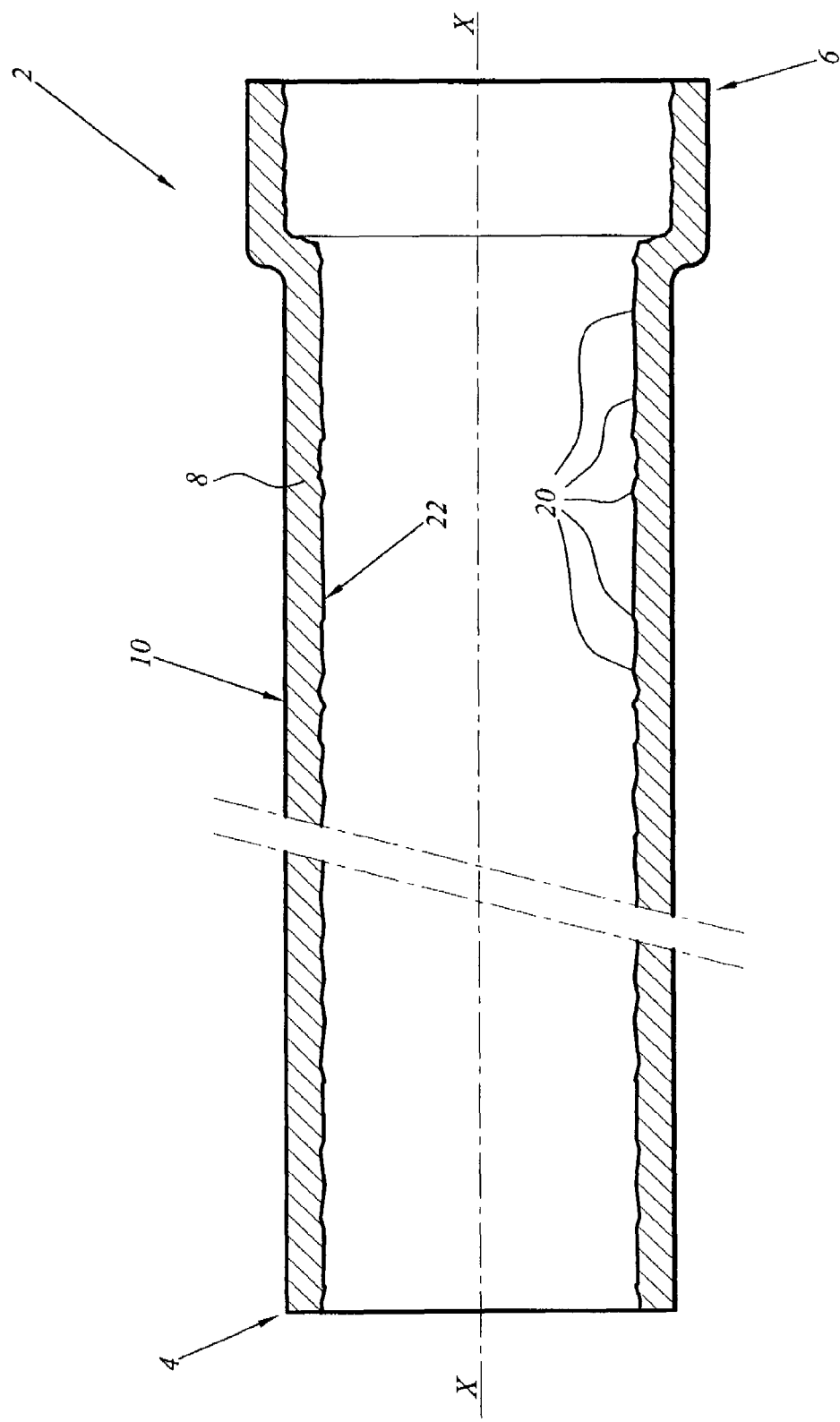
FIG. 1 is a longitudinal section of a base body of a pipe in the unprocessed state.
Figure 2:
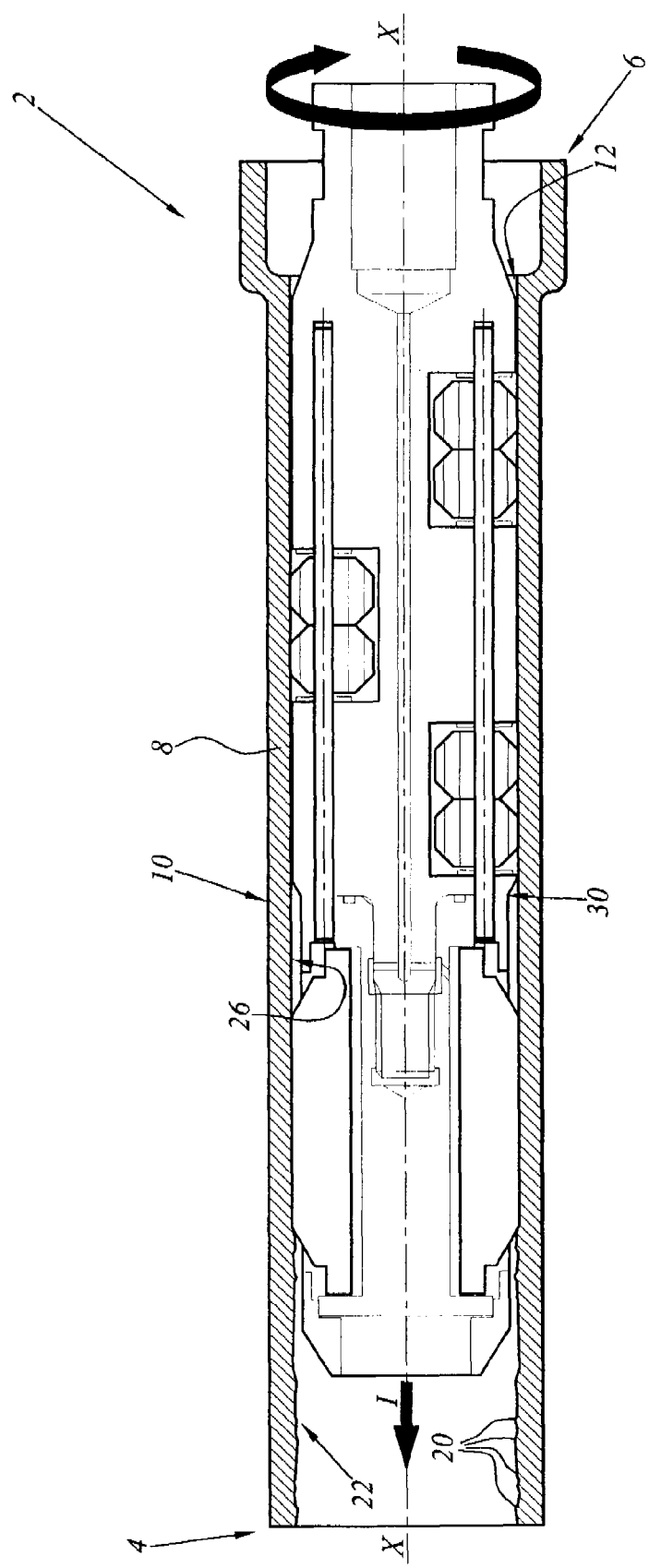
FIG. 2 is a view of the pipe base body of FIG. 1 during a step for surface preparation using a surface processing tool according to the invention.
Figure 3:
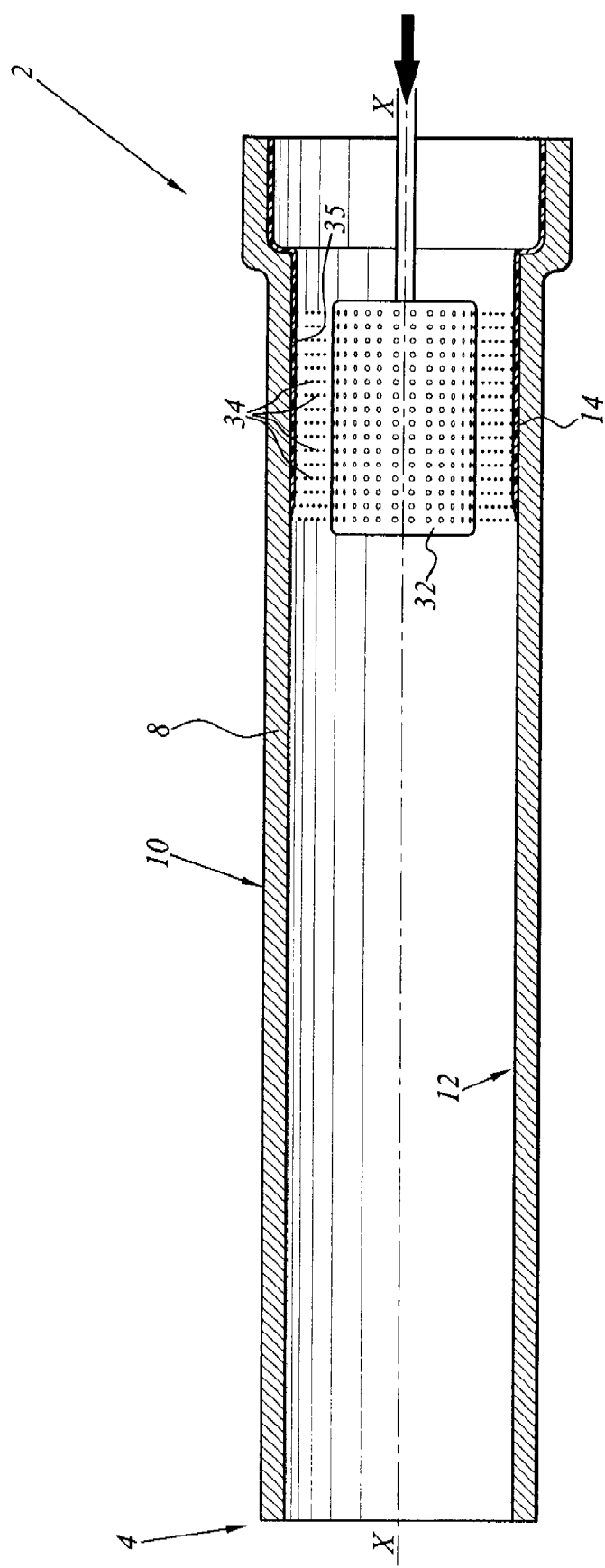
FIG. 3 is a view of the base body during a coating step of the method according to the invention.

FIGS. 1 to 3 illustrate the steps of the method for producing the pipe 2 according to the invention.

In a first step, the base body 8 is produced, for example, by casting a molten metal or a molten metal alloy, and in particular by means of centrifugal casting. The unprocessed base body 8 obtained comprises an unprocessed inner surface 22 which is provided with rough portions 20 which protrude radially inwards relative to the axis X-X. Furthermore, the unprocessed inner surface 22 is covered with a layer of iron oxides which is not illustrated and which is detrimental to the adhesion of the inner coating 14.

During a second step, illustrated in FIG. 2, the rough portions 20 are removed from the unprocessed inner surface 22 by means of partial drilling of this surface 22, thus obtaining a drilled surface 26.

The drilled surface 26 comprises free portions which are non-oxidised, portions which have a layer of oxide with a high level of adhesion, and portions which have a layer of oxide with a low level of adhesion. The portions having a layer of oxide with a low level of adhesion remaining on the drilled surface 26 are then removed during a third step by means of hammering the drilled inner surface 26, the finished hammered inner surface 12 being obtained.

The second and third steps are carried out using a surface processing tool 30.

During or after the drilling and the hammering, drilling and hammering residues are removed from the inner side of the base body 10, for example, by means of suction or blowing.

FIG. 3 illustrates the step for applying the inner coating 14 to the base body 8.

To this end, the base body 8 is heated to a level above the fusion temperature of the coating, for example, to a temperature of between 220 and 300° C., and more particularly to a temperature of 250° C.

After the base body 8 has reached the fusion temperature, a projection head 32 is introduced in accordance with a movement parallel with the axis X-X in the base body 8 and projects solid particles of coating 34 radially outwards against the inner surface 12 of the base body 8. When the particles 34 come into contact with the inner surface 12, they melt and moisten this surface 12, forming a layer of liquid coating 35. Then, the base body 8 and the layer of liquid coating 35 are cooled to ambient temperature and the layer of inner coating 14 is obtained by means of solidification.

It should be noted that between the hammering step and the step for application of the coating particles 34, the surface 12 is not processed and in particular does not require an application of a fixing primer.

Figure 5:
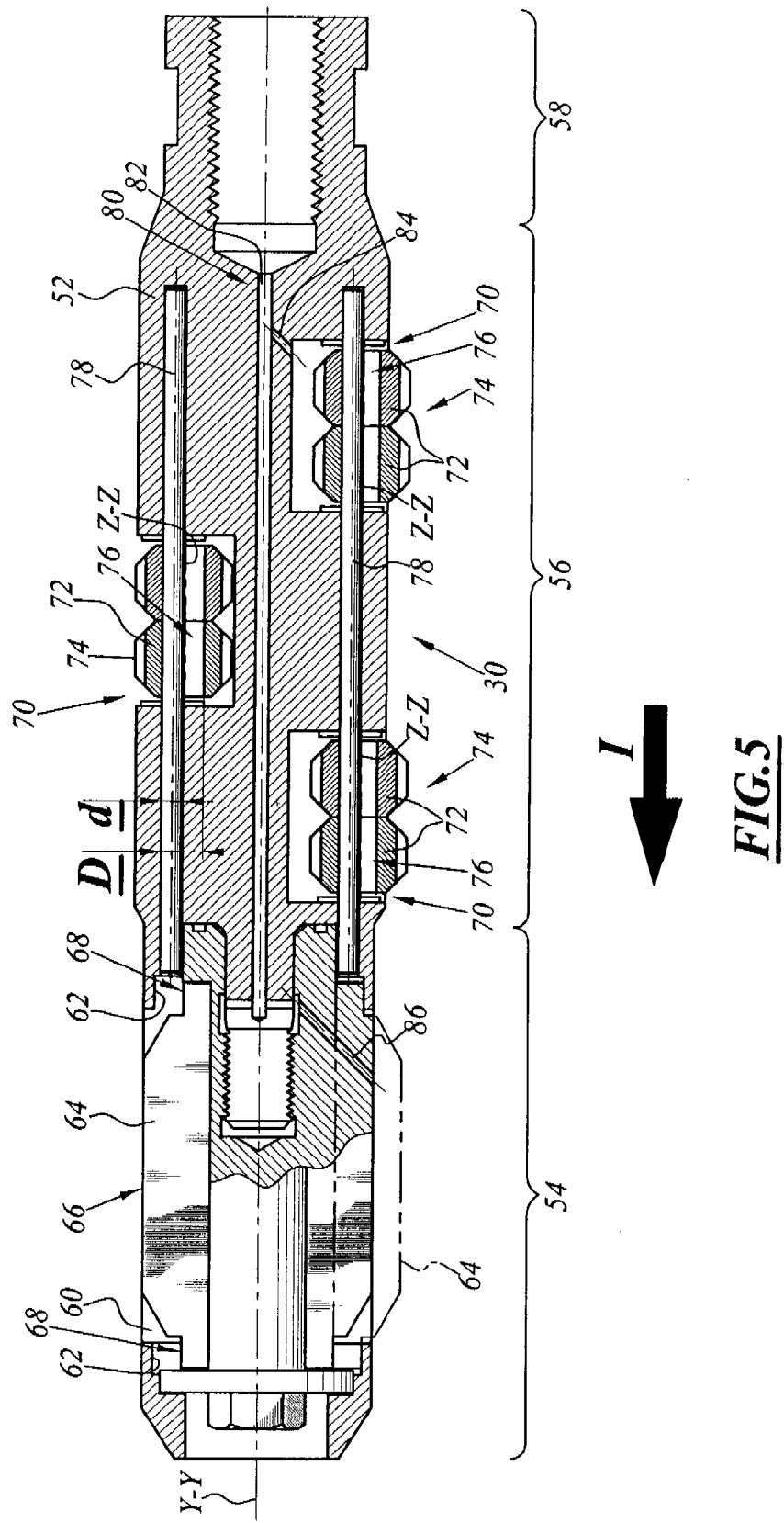
FIG. 5 is a longitudinal section of a surface processing tool used for preparing the surface of the base body.

FIG. 5 illustrates the surface processing tool 30 used to process the inner surface of the base body 8.

The surface processing tool 30 comprises a substantially cylindrical base body 52.

The tool 30 defines a centre axis Y-Y which is coaxial with the axis X-X during the processing operation.

The surface processing tool 30 is provided with a first axial drilling portion 54 and a second axial hammering portion 56, and an axial fixing portion 58. The drilling portion 54 forms a first axial end of the tool 30 and the fixing portion 58 forms a second axial end of this tool 30.

The drilling portion 54 comprises a plurality of recesses 60. Each recess 60 is radially open and delimits two abutment surfaces 62 which are directed radially inwards. A drilling blade 64 is inserted in each recess 60. The blade 64 delimits a radially outer drilling edge 66 and comprises two abutment surfaces 68 which complement the abutment surfaces 62.

The recesses 60 and the drilling blades 64 are configured in such a manner that the drilling blade 64 can be moved radially relative to the axis Y-Y between a retracted position and an extended position. The retracted position of the drilling blade 64 is illustrated in the upper portion of FIG. 5, whilst the extended position of the drilling blade 64 is illustrated with dashed lines in the lower portion of FIG. 5. It should be noted that the extended position of the drilling blade 64 is delimited by applying the abutment surface 68 against the abutment surface 62.

Furthermore, the drilling blades 64 can be moved freely between their extended and retracted positions, that is to say, they are not urged by a spring, nor by any other means for application of mechanical force.

The axial hammering portion 56 has a plurality of recesses 70 which are open radially outwards. The tool shown in FIG. 5 comprises three groups of recesses 70 which are mutually offset in an axial direction. Each group of recesses 70 is constituted by three recesses 70 which are distributed circumferentially about the axis Y-Y. Hammering elements are received in each recess 70. In this instance, each hammering element is constituted by a wheel 72 which is generally cylindrical. In each recess 70 there are arranged two wheels 72 which are mutually offset in an axial direction. Each wheel 72 delimits a hammering surface 74. The hammering surface 74 is provided with hammering markings. The hammering markings may extend parallel with the axis Y-Y or be inclined relative to this axis. If these hammering markings are inclined relative to the axis Y-Y, two wheels 72 which are arranged in the same recess 70 have hammering markings which have different directions of inclination.

Each wheel 72 is provided with a central hole 76 which has its own axis Z-Z.

The hammering portion 56 is further provided with retention rods 78 which extend axially through the recesses 70 and which extend through the central hole 76 of the associated wheels 72. The radial dimension or the diameter d of the rods 78 is less than the radial dimension or diameter D of the central hole 76. In this manner, the wheels 72 can be moved radially between a retracted position, in which the hammering surface 74 is substantially flush with the outer surface of the base body 52, and an extended position, in which the hammering surface 74 extends radially beyond the edge 66 when the drilling blade 64 is in the extended position thereof.

In a variant, means for radial retention with clearance other than the rods 78 may be envisaged for the wheels 72. In the same manner, in a variant, other hammering elements, for example, spheres, may be envisaged.

The tool 30 further comprises blowing means 80 which are suitable for blowing drilling and hammering residues out of the base body 8. These blowing means 80 comprise a central hole 82 which is provided in the base body 52. First tapping holes 84 connect the central hole 82 to the recesses 70. Second tapping holes 86 connect the central hole 82 to the outer surface of the base body 52 in the region of the drilling portion 54.

During the surface processing operation, the central hole 82 is supplied with compressed air which is discharged via the tapping holes 84, 86.

In order to process the surface, the tool 30 is driven in rotation about the axis Y-Y, for example, at 1500 rpm, and is axially introduced into the base body 8 in an introduction direction I. Owing to the centrifugal force, the edges 66 are urged towards the abutment surfaces 62. The blades 64 successively come into contact with the rough portions 20 of the base body 8 and separate them from the base body.

In the same manner, the wheels 72 are urged towards their extended position by the centrifugal force and successively come into contact with the drilled oxidised surface 26 that remains after the passage of the drilling blades.

The striking and rolling contact of the wheels 72 on the drilled surface 26 removes the skin of oxide which may be present and which does not adhesively-bond to the base body 8. Furthermore, the surface 74 produces a roughness which promotes the adhesion of the coating 14.

It has been found that the processing with the tool 30 according to the invention allows the inner coating 14 to be applied directly to the inner surface 12 of the base body, thus allowing a primer to be dispensed with.

In the same manner, the time for processing the surface using a drilling blade 64 and the hammering elements 72 is shorter than the time for processing by means of shot-blasting. Furthermore, the costs associated with the shot material and the recycling thereof are saved.

In the same manner, the composition of the coating 14 as indicated above allows a particularly high level of adhesion and a high level of resistance to wear.

The invention claimed is:
1. Pipe comprising:
   a hollow base body formed of metal, defining an outer surface of the base body and an inner surface of the base body, and
   an inner coating which is applied to the inner surface of the base body,
   wherein the inner coating is constituted by a composition consisting of a thermoplastic material and an acrylic material, and
   the thermoplastic material is based on polyolefines or based on polyamide.
2. Pipe according to claim 1, wherein the inner surface is obtained by hammering.
3. Pipe according to claim 1, wherein the base body is formed of cast iron.
4. Pipe according to claim 3, wherein the base body has a mean wall thickness of less than 4 mm.
5. Pipe according to claim 3, wherein the base body is formed of spheroidal graphite iron.
6. Pipe according to claim 1, wherein the inner coating comprises a contact surface for a food substance passing through said pipe.
7. Method for producing a pipe, the method comprising;
   forming a hollow base body of metal, to define an outer surface of the base body and an inner surface of the base body;
   processing said inner surface; and
   applying an inner coating to the inner surface of the base body,
   wherein the inner coating is constituted by a composition consisting of a thermoplastic material and an acrylic material and the thermoplastic material is based on polyolefines or based on polyamide; and
   said processing step includes:
   a) removing rough portions from an unprocessed inner surface of the base body, thus obtaining an inner surface which is partially drilled, the step of removing the rough portions being carried out by partial drilling of the unprocessed inner surface; and
   b) at least partially removing a layer of oxide on the inner surface by an oxide removal operation, to obtain a processed inner surface prior to application of said inner coating.
8. Method according to claim 7, wherein:
   the applying the inner coating comprises projecting solid particles of coating onto the inner surface of the base body and,
   the method further comprises:
   before the applying the inner coating, heating the base body to a fusion temperature of the coating particles.
9. Method according to claim 7, further comprising:
   before the removing the rough portions, producing the base body from cast iron.
10. Method according to claim 9, wherein the base body is produced from spheroidal graphite iron.
11. Method according to claim 7, wherein the oxide removal operation is hammering.
12. Method according to claim 11, further comprising:
   before the applying the inner coating, removing drilling and hammering residues by suction or blowing.

\* \* \* \* \*